Patented Dec. 26, 1950

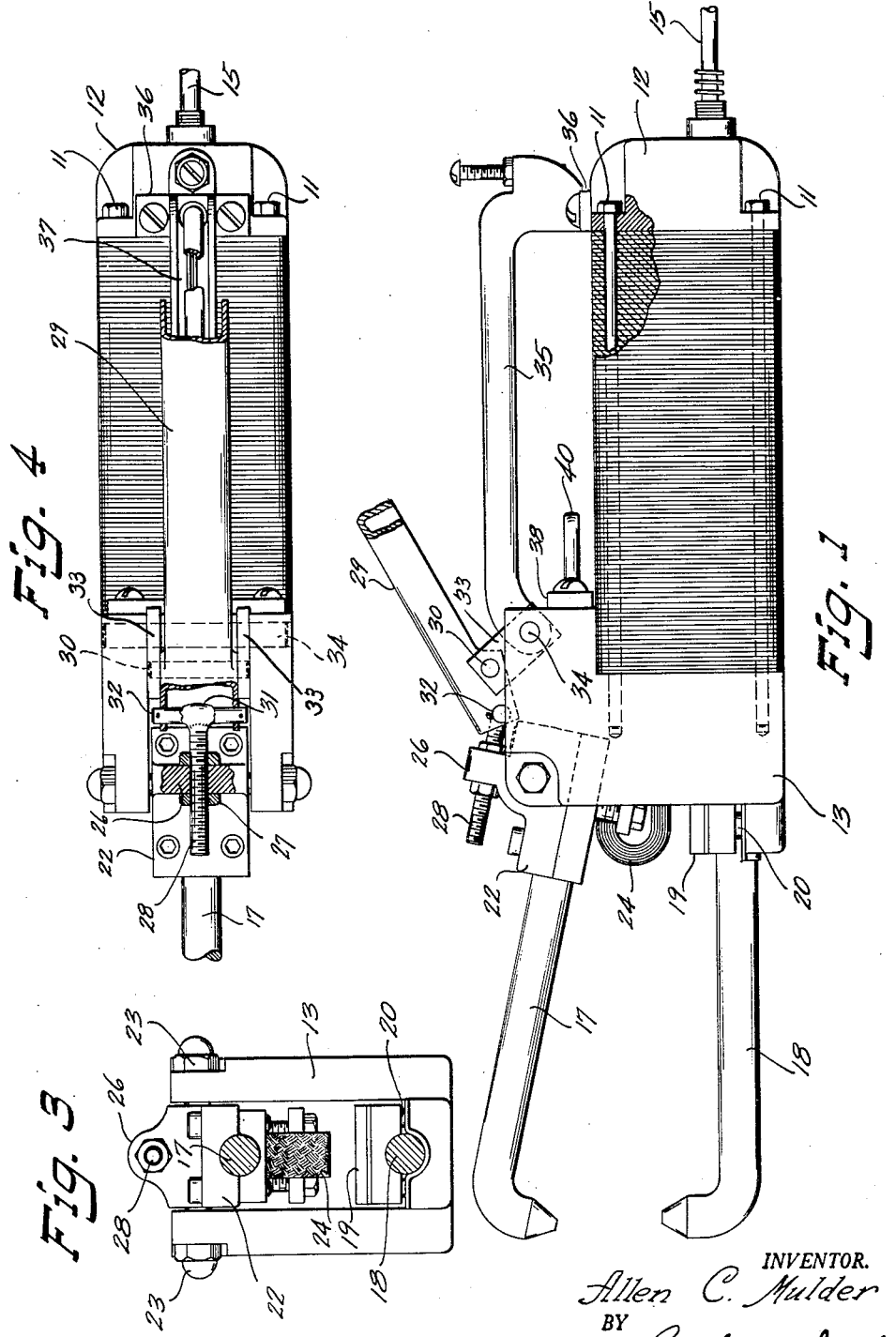

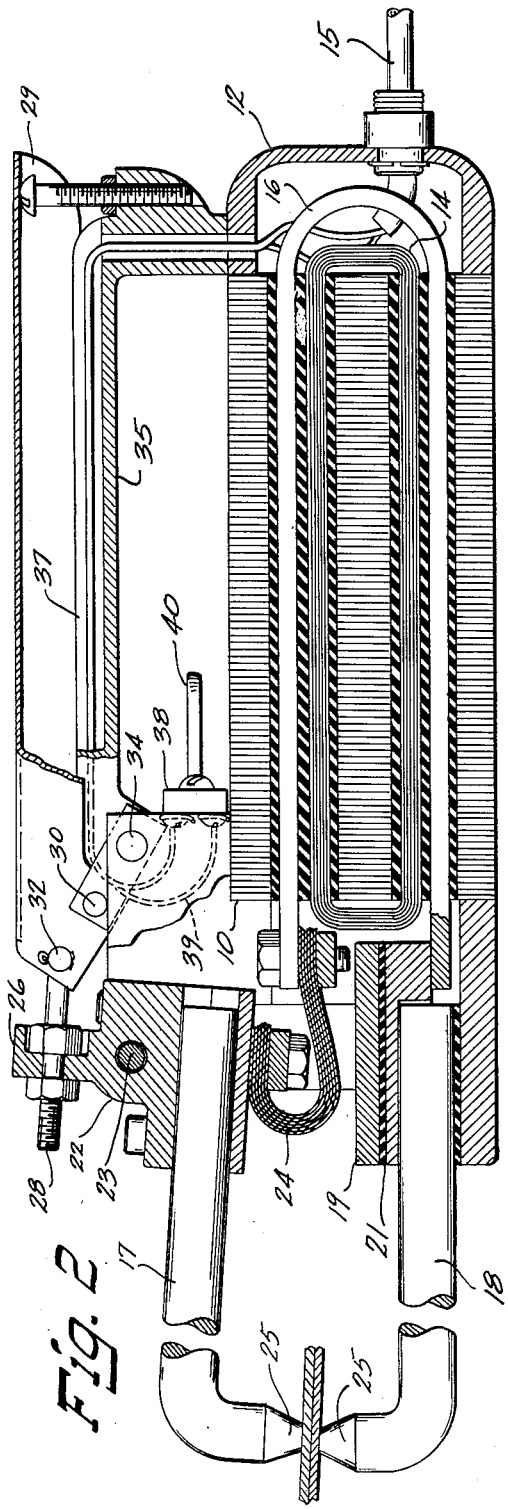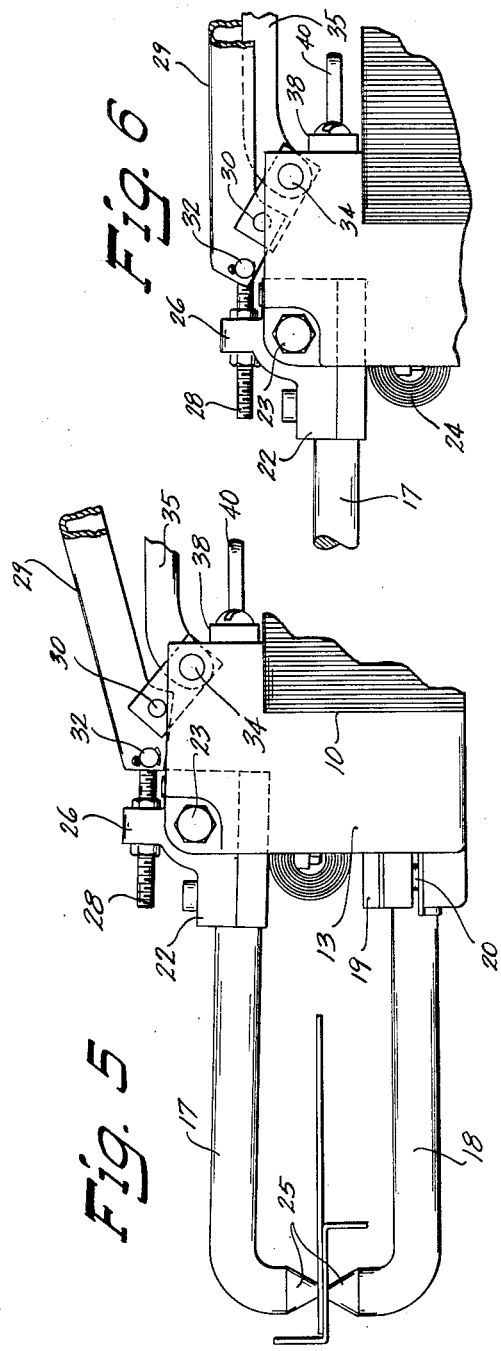

2,535,946

UNITED STATES PATENT OFFICE 2,535,946

PORTABLE MANUAL ELECTRIC SPOT WELDER

Allan C. Mulder, Appleton, Wis., assignor to Miller Electric Manufacturing Co., Appleton, Wis., a corporation of Wisconsin Application May 26, 1949, Serial No. 95,500

12 Claims. (Cl. 219—4)

This invention relates in general to a portable manual electric spot welder and in particular to a welder in which the welding pressure may be greatly increased over pressures heretofore obtainable in welders of this type.

It is generally recognized that in spot welding it is highly desirable that sufficient pressure be applied through the welding tips to the work to insure the highest quality of weld.

In portable manual electric spot welders the welding pressure is most generally supplied by the operator, that is, hand pressure supplied by the operator and transmitted through various mechanical means to the welding tips. If a number of spot welds are to be made in an article of commerce, as for instance along abutting flanges of a pair of channel members, it is highly desirable that the welds be fairly uniform. The chances of attaining this are rather remote because of the improbability that the operator will consistently apply the same hand pressure. This variation in pressure is bound to cause non-uniformity in the welds themselves due to different heats generated at the welding tips—in fact it may even cause burning of the pieces being welded.

The principal object of this invention is to provide a portable manual electric spot welder which permits greatly increased welding pressures.

Another object is to provide means in a welder of this type which permits the application of more consistently uniform welding pressures than heretofore possible.

Another object is to provide a portable manual electric spot welder which permits a ready and simple mechanical adjustment to increase or decrease the pressure at the welding tips.

Another object is to provide a portable manual electric spot welder capable of producing uniform increased welding pressures, that is entirely self-contained, of simple construction, of long life and less subject to maintenance costs.

Other objects and advantages of the invention will appear hereinafter.

The invention is illustrated in the accompanying drawing in which:

Figure 1 is a side elevation of the spot welder with parts broken away and sectioned and showing the tongs adjusted for welding relatively thick work;

Fig. 2 is a longitudinal sectional view;

Fig. 3 is a front end elevation;

Fig. 4 is a top plan view with parts broken away and sectioned;

Fig. 5 is a side elevation of the linkage mechanism showing the relationship of various parts of the structure when the tongs are primarily in contact with the work; and Fig. 6 is a view similar to Fig. 5 but showing the tongs positively locked on the work.

The spot welder illustrated may be of the general type described and claimed in the patent to Mulder, No. 2,441,438, May 11, 1948 and consists of a long substantially rectangular body made up of a plurality of laminations 10 of soft iron or other suitable magnetic material which constitutes the core for a transformer.

The laminations 10 are secured rigidly together by means of bolts 11 disposed longitudinally through the laminated core at each corner thereof and which serve to secure the opposite end caps 12 and 13 to the core. The end caps are of hollow construction to permit reception of the corresponding end loops of a primary coil 14.

Suitable lead wires 15 extend into and through the rear end cap 12 to supply current to the primary coil 14 from a source of alternating electric current.

The primary coil 14 is made up of a sufficient number of turns dependent upon the voltage of the source. For a source voltage of 110 volts about seventy-two turns are employed in the pirmary coil.

A single secondary copper turn 16 lies in a pair of spaced longitudinal openings in the core laminations 10, as does the primary coil 14. The openings are formed as complemental grooves in separate halves of each lamination.

The front end cap 13 is open longitudinally for receiving and holding the spot welding electrodes or tongs 17 and 18 extending forwardly therefrom. The lower tong 18 is fixed in that it is clamped to the lower terminal of the secondary turn 16 by means of a clamp plate 19 on top thereof, and bolts or screws 20 extending upwardly from countersunk holes in the bottom of cap 13 and threaded into clamp plate 19.

Suitable insulation material 21 is disposed between the clamp plate 19 and the terminal of secondary turn 16 and similar suitable insulating material is disposed between lower tong 18 and cap 13 to insulate fixed tong 18 from the body of the welder.

The upper or movable tong 17 is secured to a bracket 22 pivoted within the upper side of cap 13 by means of a transverse pin 23. Tong 17 is connected to the upper terminal of secondary turn 16 by means of a U-shaped flexible lead 24 which provides for pivotal movement of the upper tong without interruption of the welding current.

The outer ends of tongs 17 and 18 are bent toward each other and shaped to provide substantially conical spot welding tips 25 which face each other and are adapted to be pressed toward each other against work pieces which may be disposed therebetween.

For this purpose the upper tong 17 is moved toward and away from the lower or fixed tong 18 by pivoting of bracket 22 in cap 13. Bracket 22 is provided with an upstanding lug 26 having an aperture 27 extending therethrough and at right angles to pivot pin 23.

A bolt 28 is adjustably secured in aperture 27 and is pivotally secured to one end of a manually operable channel shaped lever 29 by means of a transverse pin 32 extending through the end of lever 29 and an eye 31 formed at one end of bolt 28 and disposed between the sides of lever 29.

Immediately adjacent transverse pin 32 and parallel thereto, a second transverse pin 30 extends between and through the sides of downwardly facing channel shaped movable lever 29 for a sufficient distance outwardly from the sides of lever 29, to form the upper pivots of link members 33 pivotally secured to pin 30.

The opposite ends of links 33 are pivotally secured to, and between a bifurcated upper and inner end portion of cap member 13 by means of a transverse pin 34 extending between and through the opposite side of the bifurcated portion of cap member 13.

It will be noted that the plurality of transverse pins 23, 30, 32 and 34 are all parallel to one another.

Handle 35 is of upwardly facing channel shape secured at its rear end to the top of cap 12 by means of a bolted flange 36. The forward end of handle 35 is secured to the upper and inner end of front cap 13 by transverse pin 34 and is disposed between the links 33.

It will be noted that the above described mechanism provides a toggle means between the lever 29 and the movable tong 17.

The relative positions of the pivot points characterized by the parallel transverse pins are such that when lever 29 is initially moved toward handle 35 the conical welding tips 25 will exert only slight pressure on work pieces disposed therebetween. Further downward movement of the outer end of lever 29 will cause an increase in pressure with maximum pressure between the welding tips being attained when the pivot points are in a position such that a straight line will pass through the center of the pivot points. Any further downward movement will lock the welding tips on the work piece and the operator may remove his hand from the handle and lever and be free to use the same hand for manipulation of an electric switch later described. This is particularly advantageous in a case where the work piece is such that it requires the use of the other hand of the operator at all times.

It will be appreciated that the above described mechanism may be used with equal facility in connection with tongs other than those in which one tong is pivoted in relation to the other. For instance, the mechanism may be employed advantageously to manipulate adjustable tongs disposed parallel to one another.

If it becomes desirable to increase or decrease the welding pressure applied to the work pieces when the lever 29 is fully depressed, this may be done by shifting the position of the pivot represented by transverse pin 32. To accomplish this it is only necessary to adjust bolt 28 inwardly or outwardly in threaded aperture 27 of lug 26 thereby raising or lowering transverse pin 32.

Experimental tests have demonstrated that employment of the particular mechanism above described in connection with six inch welding tongs increases or multiplies the welding pressure approximately ten times. In other words, using six inch tongs, 100 pounds hand pressure applied to a pivoted lever such as shown in patent to Mulder, No. 2,441,438 will be translated to about 50 pounds pressure at the tongs, whereas, with the mechanism of this invention, 100 pounds hand pressure applied to the lever will be translated into approximtaely 500 pounds tong or welding pressure. This pressure may be repeatedly applied to a series of welds with great uniformity. If less welding pressure is desirable this may be accomplished by simply shifting the position of the pin 32 as above described.

The upper surface of handle 35 is provided with a channel groove 37 for receiving one of lead wires 15 which passes upwardly through end cap 12 through groove 37 to cap 13 where it is connected to one terminal of a switch 38. The other terminal of switch 38 connects to a return wire 39 passing rearwardly along channel groove 37 to cap 12 and then to primary coil 14.

Switch 38 has a rearwardly extending lever 40 beneath handle 35 for ready control of the welding current during operation of the welder.

The downwardly faced channel of lever 29 covers the upwardly facing groove in the top surface of handle 35 and serves to protect the wires therein from injury.

The mechanism described provides a welder that is simple and light weight to operate and of relatively few parts so that it is economical to fabricate with little or no danger of breakdown attendant with a complicated structure.

The invention contemplates various embodiments within the scope of the accompanying claims.

I claim:

1. A manually operated lightweight portable electric spot welder comprising a transformer having a core and end caps, a pair of relatively movable tongs carried by one of said end caps and connected therethrough to the secondary of the transformer, a carrying handle secured to at least one of said end caps, an operating handle overlying said carrying handle in spaced hand gripping relation thereto and secured to one of said end caps, and a mechanical power multiplier disposed between said operating handle and the relatively movable tongs whereby the manual pressure applied by the operator to said handles is substantially increased between the ends of said tongs.

2. A manually operated lightweight portable electric spot welder comprising a transformer having a core and end caps, a pair of relatively movable tongs carried by one of said end caps and connected therethrough to the secondary of the transformer, a carrying handle secured to at least one of said end caps, an operating handle overlying said carrying handle in spaced hand gripping relation thereto and secured to one of said end caps, and toggle means disposed between said operating handle and the relatively movable tongs whereby the manual pressure applied by the operator to said handles is substantially increased between the ends of the tongs.

3. A manually operated lightweight portable electric spot welder comprising a transformer having a core and end caps, a pair of tongs carried by one of said end caps and connected therethrough to the secondary of the transformer, a carrying handle extending along one side of said core in spaced relation thereto and secured to the end cap carrying said tongs, one of said tongs being movable in said end cap adjacent the end of the handle, an operating handle overlying said carrying handle in spaced hand gripping relation thereto and carried by the end cap carrying said tongs, and a mechanical power multiplier disposed between said operating handle and said movable tong whereby the manual pressure applied by the operator to said handles is substantially increased between the ends of said tongs.

4. A manually operated lightweight portable electric spot welder comprising a transformer having a core and end caps, a pair of tongs carried by one of said end caps and connected therethrough to the secondary of the transformer, a carrying handle extending along one side of said core in spaced relation thereto and secured to the end cap carrying said tongs, one of said tongs being movable in said end cap adjacent the end of the handle, an operating handle overlying said carrying handle in spaced hand gripping relation thereto and carried by the end cap carrying said tongs, and toggle means disposed between said operating handle and said movable tong whereby the manual pressure applied by the operator to said handles is substantially increased between the ends of said tongs.

5. A manually operated lightweight portable electric spot welder comprising a transformer having a core and end caps, a pair of welding tongs carried by one of said caps and connected therethrough to the secondary of the transformer, a handle extending along one side of said core in spaced relation thereto and secured to the end cap carrying said tongs, one of said tongs being pivotally mounted to the end cap adjacent the end of said handle, a lever overlying the handle and a mechanical power multiplier disposed between said lever and the pivotally mounted tong whereby the manual pressure applied by the operator to the lever and the handle is substantially increased between the ends of the tongs.

6. A manually operated lightweight portable electric spot welder comprising a transformer having a core and end caps, a pair of welding tongs carried by one of said caps and connected therethrough to the secondary of the transformer, a handle extending along one side of said core in spaced relation thereto and secured to the end cap carrying said tongs, one of said tongs being pivotally mounted to the end cap adjacent the end of said handle, a lever overlying the handle, and toggle means disposed between said lever and the pivotally mounted tong whereby the manual pressure applied by the operator to the lever and the handle is substantially increased between the ends of the tongs.

7. A manually operated lightweight portable electric spot welder comprising a transformer having a core and end caps, a pair of welding tongs carried by one of said caps and connected therethrough to the secondary of the transformer, a handle extending along one side of said core in spaced relation thereto and secured to the end cap carrying said tongs, one of said tongs being pivotally mounted to the end cap adjacent the end of said handle, a lever overlying the handle in hand gripping relation thereto, and toggle means disposed adjacent one end of said handle and the lever and being pivotally secured to the end cap and lever to interconnect the latter with said tong and operate the same whereby the manual pressure applied by the operator to said handle and said lever is substantially increased between the ends of the tongs, said toggle means being disposed to approach a dead center position rapidly as said lever approaches said handle whereby a large mechanical advantage is obtained.

8. A manually operated lightweight portable electric spot welder comprising a transformer having a core and end caps, a pair of welding tongs carried by one of said caps and connected therethrough to the secondary of the transformer, a handle extending along one side of said core in spaced relation thereto and secured to the end cap carrying said tongs, one of said tongs being pivotally mounted to the end cap adjacent the end of said handle, a lever overlying the handle in hand gripping relation thereto, means disposed adjacent one end of said handle and the lever and pivotally secured to one end cap and said lever to interconnect the latter with said pivotally mounted tong, said means comprising a link disposed between one end of said handle and the lever, a pivot pin disposed between the one end of said link and the lever, and a pivot pin disposed between an opposite end of said link and said end cap whereby the manual pressure applied by the operator to the lever and the handle is substantially increased between the ends of the tongs.

9. A manually operated lightweight portable electric spot welder comprising a transformer having a core and end caps, a pair of welding tongs carried by one of said caps and connected therethrough to the secondary of the transformer, a handle extending along one side of said core in spaced relation thereto and secured to the end cap carrying said tongs, one of said tongs being pivotally mounted to the end cap adjacent the end of said handle, a lever overlying the handle in hand gripping relation thereto, toggle means disposed adjacent one end of said handle and the lever and being pivotally secured to the end cap and lever to interconnect the latter with said tong and operate the same, and adjusting means disposed between the lever and the movable tong to compensate for varying thickness of work when disposed between said tongs.

10. A manually operated lightweight portable electric spot welder comprising a transformer having a core and end caps, a pair of welding tongs carried by one of said caps and connected therethrough to the secondary of the transformer, a handle extending along one side of said core in spaced relation thereto and secured to the end cap carrying said tongs, one of said tongs being pivotally mounted to the end cap adjacent the end of said handle, a lever overlying the handle in hand gripping relation thereto, toggle means disposed adjacent one end of said handle and the lever and being pivotally secured to the end cap and lever to interconnect the latter with said tong and operate the same whereby the manual pressure applied by the operator to said handle and said lever is substantially increased between the ends of the tongs, said toggle means being disposed to approach a dead center position rapidly as said lever approaches said handle whereby a large mechanical advantage is obtained, and adjusting means disposed between the lever and the movable tong to vary the pressure applied between said tongs when the toggle means approaches a dead center.

11. A manually operated lightweight portable electric spot welder comprising a transformer having a core and end caps, a pair of welding tongs carried by one of said caps and connected therethrough to the secondary of the transformer, a handle extending along one side of said core in spaced relation thereto and secured to the end cap carrying said tongs, one of said tongs being pivotally mounted to the end cap adjacent the end of said handle, a lever overlying the handle in hand gripping relation thereto, toggle means disposed adjacent one end of said handle and the lever and being pivotally secured to the end cap and lever to interconnect the latter with said tong and operate the same whereby the manual pressure applied by the operator to said handle and said lever is substantially increased between the ends of the tongs, said toggle means being disposed to approach a dead center position rapidly as said lever approaches said handle whereby a large mechanical advantage is obtained, and means comprising an eye bolt disposed between the lever and the movable tong and adjustable with relation to the lever to vary the pressure applied between said tongs when the toggle means approaches a dead center and to compensate for varying thickness of work when disposed between said tongs.

12. A manually operated lightweight portable electric spot welder comprising a transformer having a core and end caps, a pair of relatively movable tongs carried by one of said end caps and connected therethrough to the secondary of the transformer, a carrying handle secured to at least one of said end caps, an operating handle overlying said carrying handle in spaced hand gripping relation thereto and secured to one of said end caps, and a mechanical power multiplier disposed between said operating handle and the relatively movable tongs, said mechanical power multiplier including an adjustment to vary the pressure applied between said tongs and to compensate for varying thickness of work when disposed between said tongs.

ALLAN C. MULDER.

REFERENCES CITED

The following references are of record in the file of this patent:

UNITED STATES PATENTS

| Number | Name | Date |
|---|---|---|
| 2,189,784 | Eckman | Feb. 13, 1940 |
| 2,310,556 | Strong | Feb. 9, 1943 |
| 2,464,054 | Pawlk | Mar. 8, 1949 |